(12) United States Patent
Foster

(10) Patent No.: US 8,714,033 B2
(45) Date of Patent: May 6, 2014

(54) CATCHER PIN ASSEMBLY

(75) Inventor: Lawrence D. Foster, Derby (GB)

(73) Assignee: Rolls-Royce PLC, London (GB)

( * ) Notice: Subject to any disclaimer, the term of this patent is extended or adjusted under 35 U.S.C. 154(b) by 83 days.

(21) Appl. No.: 13/312,396

(22) Filed: Dec. 6, 2011

(65) Prior Publication Data
US 2012/0096951 A1  Apr. 26, 2012

Related U.S. Application Data

(62) Division of application No. 12/591,350, filed on Nov. 17, 2009, now abandoned.

(30) Foreign Application Priority Data

Dec. 22, 2008 (GB) .................................. 0823238.1

(51) Int. Cl.
*B25B 23/14* (2006.01)
*G01L 5/24* (2006.01)

(52) U.S. Cl.
USPC .......................................... 73/862.21; 244/54

(58) Field of Classification Search
USPC ............................ 73/862.08, 862.21, 862.381
See application file for complete search history.

(56) References Cited

U.S. PATENT DOCUMENTS

| | | | |
|---|---|---|---|
| 2,343,426 A * | 3/1944 | Tyler ............................. | 248/556 |
| 5,078,342 A | 1/1992 | Langley et al. | |
| 5,082,387 A | 1/1992 | DeVries | |
| 5,273,249 A | 12/1993 | Peterson et al. | |
| 5,275,357 A | 1/1994 | Seelan et al. | |
| 5,303,880 A | 4/1994 | Cencula et al. | |
| 5,649,417 A | 7/1997 | Hey | |
| 5,725,181 A | 3/1998 | Hey | |
| 6,607,165 B1 | 8/2003 | Manteiga et al. | |
| 7,329,066 B2 * | 2/2008 | Pineiros et al. ............... | 403/353 |
| 2006/0280551 A1 | 12/2006 | Pineiros et al. | |

OTHER PUBLICATIONS

United Kingdom Search Report issued in British Application No. 0823238.1 on Apr. 17, 2009.
Sep. 6, 2011 Office Action issued in U.S. Appl. No. 12/591,350.

* cited by examiner

*Primary Examiner* — Lisa Caputo
*Assistant Examiner* — Roger Hernandez-Prewitt
(74) *Attorney, Agent, or Firm* — Oliff PLC

(57) ABSTRACT

A catcher pin assembly for attachment to a catcher link of an aircraft frame, the catcher pin assembly having an engine mounting element, a catcher pin, a compressible element, and a nut, which is lockable to the catcher pin, the compressible element being compressed between the pin and the mounting element and/or between the mounting element and the nut, in the assembled condition of the assembly, such that the compressible element applies a predetermined resistance to rotation of the catcher pin relative to the mounting element. The invention also relates to a method of testing a catcher pin assembly to determine if the catcher pin is carrying load from the catcher link, the method including applying a predetermined torque to the catcher pin sufficient to overcome the resistance to rotation of the catcher pin when it is unloaded, and determining whether the catcher pin rotates relative to the mounting element.

7 Claims, 3 Drawing Sheets

CATCHER PIN ASSEMBLY

This is a Division of Application Ser. No. 12/591,350 filed Nov. 17, 2009. The disclosure of the prior application is hereby incorporated by reference herein in its entirety.

This invention relates to a catcher pin assembly and particularly, although not exclusively, relates to an engine mount failsafe assembly for attaching an engine to an aeroplane.

BACKGROUND

A conventional failure tolerant engine mounting is formed by three links between the engine and its support structure. One of the links is normally unloaded, but is arranged so that in the event of failure of either of the other links it will form the third point of connection between the engine and supporting structure, thereby retaining the engine in position relative to the support structure and avoiding a potentially catastrophic failure of the engine mount.

U.S. Pat. No. 5,725,181 shows an arrangement for mounting an engine on an aircraft. A number of mounting bolts (or "pins") are used, but in normal use at least one bolt/pin is redundant and only takes load in the event that one of the other mounting bolts/pins fails. Normally, in order to prevent vibration of the pin, it is required to tighten it up such that it clamps its respective yoke and catcher link. However, in order to inspect this pin to determine whether one of the other pins has failed, it is required to fully remove it, or at least start to extract the bolt from its lock nut. This can be a time consuming exercise, since these bolts are normally in hard to access places, and undoing the lock nut may result in the need to replace or refurbish the locking arrangement, such as replacing locking wire or coatings.

SUMMARY

According to a first aspect of the present invention there is provided a catcher pin assembly comprising a mounting element, a catcher pin, a compressible element, and a retaining element which is lockable to the catcher pin, the compressible element being compressed between a head of the pin and the mounting element and/or between the retaining element and the mounting element, in the assembled condition of the assembly, such that the compressible element applies a predetermined resistance to movement of the pin relative to the mounting element.

The said predetermined resistance to movement may be a resistance to rotational movement of the pin.

The compressible element may comprise a resilient element such as a spring washer. For example it may comprise at least one conical spring washer.

The compressible element and/or at least a part of the pin and/or the mounting element and/or the retaining element may be provided with an anti-friction coating.

The retaining element may comprise any retaining device such as a split pin, a circlip, a roll pin or a nut, or may even comprise a welded, bonded, brazed, shrink fit or press fit element.

The compressible element and/or at least a part of the pin and/or the mounting element and/or the lockable retaining element may be provided with a corrosion resistant and/or anti-friction coating. The coating may be applied to a part only of one or more of these components. For example, it may be applied just to a single contact face of the compressible element. If there are a plurality of compressible elements the coating may be applied to all or just some of the compressible elements.

There may be more than one compressible element on at least one side of the mounting element. For example, there may be two or more compressible elements on each side of the mounting element.

The catcher pin may comprise a stepped bolt, a shoulder being defined between a main shank portion and a threaded portion of the bolt, the shoulder limiting the motion of the retaining element.

A lock nut, locking wire, split pin, thread locking compound or other locking means may be provided to lock the retaining element to the catcher pin.

According to another aspect of the present invention there is provided a method of testing a catcher pin assembly comprising a catcher pin, a lockable retaining element and a mounting element, the method comprising passing the catcher pin through the mounting element into the lockable retaining element, using the retaining element to tightening the catcher pin assembly to a predetermined degree, locking the lockable retaining element to the catcher pin, determining an unloaded pin torque at which the catcher pin will just rotate relative to the mounting element when the catcher pin is not loaded, subsequently applying a test torque at least equal to the unloaded pin torque to the catcher pin, and determining whether the catcher pin moves relative to the mounting element. In accordance with this aspect of the invention, it is not necessary to undo the catcher pin locking arrangement to establish whether the pin is taking any load.

The method may further comprise compressing a compressible element between an end of the catcher pin and the mounting element as the catcher pin is tightened onto the mounting element. The resilient element should prevent vibration whilst at the same time should allow repeatable resistance to rotation of the bolt relative to its catcher link.

There may be provided a method of testing a catcher pin assembly to determine if the catcher pin is carrying load applied by a structure supported on a mounting element of the catcher pin assembly, the method comprising applying a predetermined force to a catcher pin sufficient to overcome the resistance to movement of the pin when it is unloaded, and determining whether the pin moves relative to the mounting element. If the pin does not move the catcher pin must be carrying load from the structure. The said structure may comprise a failure tolerant mounting for a rotary machine, such as a gas turbine engine on an aircraft.

There may be provided a catcher pin assembly for a failure tolerant machinery mounting, the catcher pin assembly comprising a pin and a compressible element which when compressed to a predetermined degree by the pin applies a predetermined resistance to rotation of the pin.

There may be provided a catcher pin assembly comprising a mounting element, a catcher pin, a compressible element, and a nut which is lockable to the catcher pin, the compressible element being compressed between the pin and the mounting element and/or between the mounting element and the nut, in the assembled condition of the assembly, such that the compressible element applies a predetermined resistance to movement of the pin relative to the mounting element.

According to another aspect of the present invention there provided a method of testing a catcher pin assembly comprising a catcher pin, a lockable nut and a mounting element, the method comprising passing the catcher pin through the mounting element into the lockable nut, tightening the lockable nut onto the catcher pin to a predetermined degree, locking the nut to the catcher pin, determining an unloaded pin torque at which the catcher pin will just rotate relative to the mounting element when the catcher pin is not loaded, subsequently applying a test torque at least equal to the unloaded pin torque to the catcher pin, and determining whether the catcher pin moves relative to the mounting element.

In the above described aspects of the invention, the said predetermined force may be a predetermined torque, and the said resistance to movement may be a resistance to rotational movement of the pin. Alternatively, the force may be a linear force applied to the catcher pin along an axis of a shank of the catcher pin. For example, the head of the pin could be struck with a copper faced mallet. If the pin is unloaded it will move away from the blow to compress the compressible element then spring back as the compressible element recovers its shape. If however the pin is loaded, it will resist movement from the hammer blow, or will move permanently to partially compress the compressible element. It will be appreciated that this "linear force" arrangement is faster and easier to test, but is less accurate and repeatable than the "rotational torque" arrangement described above.

The mounting element may comprise a failure tolerant mounting bracket for a rotary machine, such as an engine mount for an aircraft engine. The catcher pin may connect the mounting element to a catcher link for attachment to a support structure such as an aircraft frame. The catcher pin may pass through an opening in the catcher link with some play.

The mounting element may comprise a yoke having a pair of flanges and the flanges may project substantially at right angles from a web of the yoke. The catcher link may be supported on the catcher pin between the flanges of the yoke.

BRIEF DESCRIPTION OF THE DRAWINGS

For a better understanding of the present invention and to show how it may be carried into effect, reference will now be made by way of example to the accompanying drawings, in which.

DETAILED DESCRIPTION OF EMBODIMENTS

Figure 1:
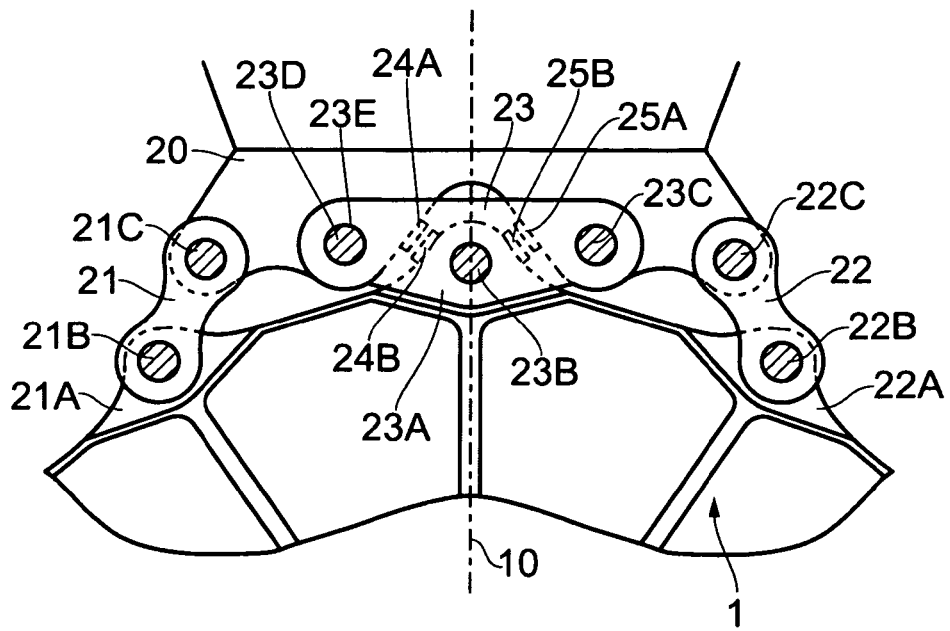
FIG. 1 illustrates a connection between an engine frame and an aircraft structural member.

An aircraft gas turbine engine includes a rigid frame 1. The engine frame 1 is linked to flange 20 attached to an aircraft structural member (not shown) by three link members 21, 22 and 23.

Three flanges 21A, 22A and 23A are formed on the engine frame 1. The link member 21 is connected to the flange 21A by a pin 21B which passes through matching sized holes in the flange 21A and the link member 21 and to the flange 20 by a pin 21C which passes through matching sized holes in the link member 21 and flange 20.

Similarly the link member 22 is connected to the flanges 22A and 20 by pins 22B and 22C respectively which pass through matching sized holes in the link member 21 and flanges 21A and 20 respectively.

The links formed by link members 21 and 22 and their associated pins 21A, 22A, 21B and 22B support the weight of the engine 1.

The link member 23 is connected to the flange 23A by a pin 23B which passes through matching sized holes in the flange 23A and link member 23, it is also connected to the flange 20 by a pin 23C which passes through matching sized holes in the flange 20 and link member 23. The link member 23 also forms a fail safe connection by a pin 23D which passes through a matching sized hole in the flange 20 and an oversized hole 23E in the link member 23. The pins 23C and 23D are equally spaced on either side of the vertical plane 10. Two pairs of torque stops 24A, 24B and 25A, 25B are attached to opposing faces of the flanges 20 and 23A. The torque stops 24A and 25A are attached to the flange 20 while the torque stops 24B and 25B are attached to the flange 23A.

The link formed by the link member 23 and its associated pins 23B and 23C supports the torque on the engine 1.

If one of the link members 21 and 22 or their associated pins 21B, 21C, 22B and 22C fails, the engine 1 will drop until the pin 23D contacts the edge of the over-sized hole 23E, the weight of the engine 1 will then be supported by the remaining one of links formed by link members 21 and 22 and the link member 23 by way of the three pins 23B, 23C and 23D, while the link member 23 will continue to support the torque on the engine 1. Since the link member 23 and its attachments to the flanges 20 and 23A by pins 23B, 23C and 23D are symmetrical about the vertical plane 10 which passes through the centre of gravity of the engine 1, no unwanted couple is generated by the weight of the engine 1.

If the pin 23C or the link member 23 between pins 23B and 23C fails, the engine 1 will rotate until the pin 23D contacts the edge of the oversized hole 23E, whereupon the pins 23B and 23D and the link member 23 between them will support the torque. Alternatively, if the pin 23B fails, the engine 1 will rotate until one of the two pairs of torque stops 24A, 24B, 25A and 25B are brought into contact, whereupon the torque will be supported by one of the pairs of torque stops 24A, 24B, 25A, and 25B depending on the direction of the torque.

In either case the links formed by link members 21 and 22 will support the weight of the engine.

Figure 2:
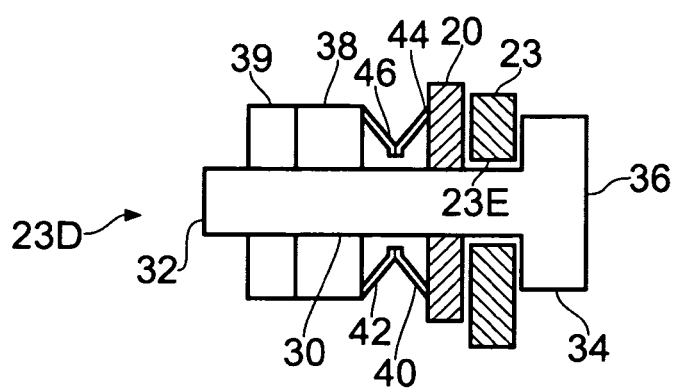
FIG. 2 is a cross section through a catcher pin assembly.

FIG. 2 is an enlarged view of the catcher pin assembly connecting the flange 20 to the link member 23. The pin 23D comprises a shank 30 which is threaded at one end 32 and has a hexagonal head 34 at the opposite end 36. A nut 38, lock nut 39 and conical spring washers 40, 42 are fitted to the threaded end 32 of the pin 23D, and retain the pin 23D in position in the hole in the flange 20 and in the oversized hole 23E in the link member 23. In order to install the pin 23D it is first inserted through the oversized hole 23E and the hole in the flange 20. The two conical spring washers 40, 42 are then slipped over the threaded end 32 of the pin 23D. The first spring washer 40 is slipped over the threaded end 32 with its larger diameter face 44 leading and the second spring washer 42 is slipped over the threaded end 32 with its smaller diameter face 46 leading. The nut 38 is then threaded onto the shank 30 and is tightened to a predetermined torque or to a predetermined degree of compression of the spring washers 40, 42. The lock nut 39 is then tightened against the nut 38 to lock it in position.

With the pin 23D in an unloaded condition and tightened as described above, a wrench applied to the head 34 will rotate the pin 23D relative to the flange and link member 23 at a torque exceeding an unloaded pin torque. If, in service, the pin 23D subsequently becomes loaded due to failure of one of the other components of the engine mounting, as described above, this can be detected merely by applying a torque in excess of the unloaded pin torque to the head 34 using a conventional torque wrench. This is because when a component of the engine mounting fails, the link member 23 moves sufficiently for the oversized hole to engage the shank 30 of the pin 23D and apply a load to the pin 23D. This load causes a resistance to turning of the pin 23D and hence increases the torque required to turn the pin 23D, such that it significantly exceeds the unloaded pin torque.

Consequently, simply by applying a torque greater than the unloaded pin torque to the head 34, it is possible to determine whether a component of the engine mounting has failed. In practice, if a component of the engine mounting fails, a large load will be applied to the pin 23D, so that it would not be possible to turn the pin 23D until a torque considerably in excess of the unloaded pin torque is applied to the head 34. Furthermore, during the service life of the catcher pin assembly, corrosion or debris may accumulate in and around the catcher pin assembly, which might have the effect of increasing the torque necessary to rotate the catcher pin even when it is unloaded. Therefore, a torque of at least 15% to 50% greater than the unloaded pin torque may be applied to the head to test whether the pin 23D is loaded.

In another embodiment not illustrated, the conical spring washers 40, 42 are omitted and the nut 38 is tightened to a predetermined torque against the flange 20. A non-corrosive and/or anti-friction coating may be applied to the contact faces between the nut 38 and the flange 20 and/or between the head 34 and the link member 23. As in the previous embodiment, once the unloaded pin torque has been determined, if in service, the pin 23D subsequently becomes loaded due to failure, this can be detected by applying to the pin 23D a torque 15% to 50% in excess of the unloaded pin torque.

Figure 3:
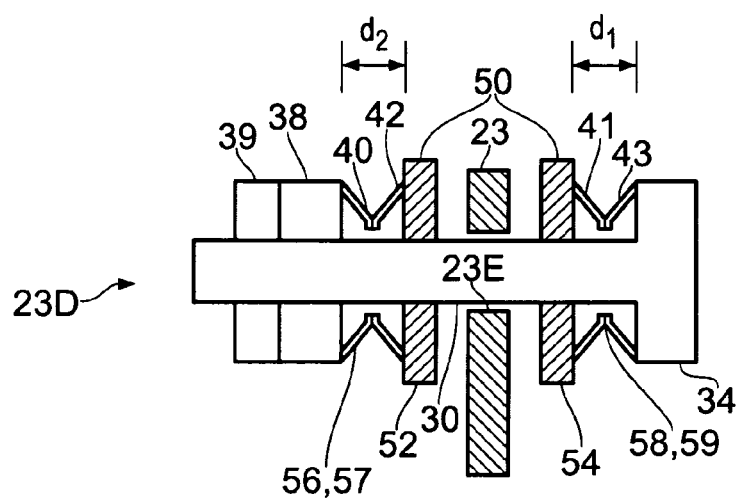
FIG. 3 is a cross section through a catcher pin assembly according to another embodiment of the invention.

FIG. 3 shows an alternative embodiment of catcher pin assembly. This embodiment is similar to the previous embodiment except that the catcher pin 23D is attached to an engine mount having a mounting yoke 50. The yoke 50 comprises a pair of substantially parallel flanges 52, 54, and pairs of conical spring washers 40, 42, 41, 43 are mounted on the shank 30 of the pin 23D on both sides of the yoke. The conical spring washers 40, 42, 41, 43 are assembled with their smaller diameter contact surfaces 56,57,58,59 abutting.

As in the previous embodiment, a catcher link member 23 is supported on the shank 30 of the catcher pin 23D. The catcher link member 23 forms a failsafe connection by means of the pin 23D, which passes through a matching size hole in the flange 54, the oversized hole 23 in the link member 23 and another matching size hole in the other flange 52.

The required tightening pin torque is achieved by creating an end load during installation by using the conical spring washers 40, 42, 41, 43. The objective is to realise only just sufficient end load to avoid movement and fretting of the catcher pin 23D within the yoke 50 during service. This can be achieved by either a pre-determined installation torque or by an installation procedure that requires that the catcher pin 23D is tightened, compressing the conical spring washers 40, 42, 41,43 until predetermined gaps d1 and d2 are achieved. These gaps can be measured with feeler gauges or the catcher pin 23D could incorporate a stepped shoulder (not shown) the nut 38 being tightened to the shoulder (ie causing a predetermined compression of the conical spring washers 40, 42, 41, 43). The nut 38 is then locked to the catcher pin 23D. This can be achieved in a number of ways, such as with a lock nut, locking wire, split pin, thread locking compound or other locking means. The simplest method is the use of the lock nut 39 as shown in the previous embodiment. If the lock nut is itself self-locking or is a 'stiff' nut, this provides a double locked interface.

Once installed and locked, with the arrangement in an "un-failed condition" if a torque is applied to the catcher pin 23D using a torque wrench, the only torque recorded will be the unloaded pin torque caused by the resistive friction between the contact surfaces 56,57,58,59 of the conical spring washers, because these contact surfaces 56,57,58,59 are of smaller diameter than the contact surfaces between the conical spring washers 40, 43 with the flanges 52, 54 of the yoke 50, the head 34 of the pin 23D or the nut 38. To facilitate smooth relative rotation of the components, even after a long service life, a non-corrosive and/or anti-friction coating may be applied to some or all of these contact faces or an anti-friction washer may be introduced in the interface between the surfaces. This arrangement also ensures that no fretting occurs between the conical spring washers 40, 42, 41, 43 and the flanges 52, 54 of the yoke 50.

In the "failed condition" the catcher link member 23 will come into contact with the catcher pin 23D. If a torque is applied to the head 34 of the catcher pin 23D, the torque recorded will be the sum of the conical washer resistive friction and the friction between the catcher link member 23 and the catcher pin 23D. A significant increase in resistive torque will indicate that the catcher pin 23D is loaded. Hence, there must be a failure in the primary load path, due to failure of a component of the engine mount.

Figure 4:
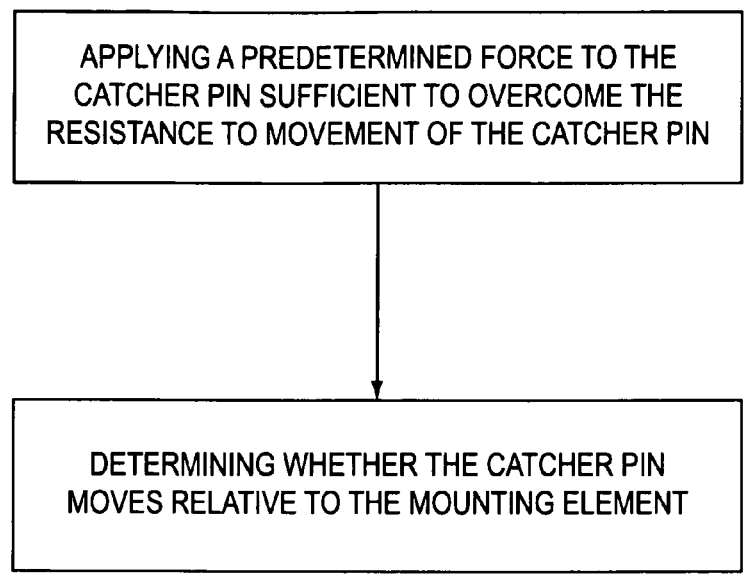
FIG. 4 illustrates the method steps for testing a catcher pin assembly.

An advantage of the invention is that a servicing schedule for a mechanic to check whether a component of the engine mounting has failed according to the steps illustrated in FIG. 4 are simplified to the following:

To install catcher pin and establish "unloaded pin torque":
1 Install of catcher pin assembly, as set out above.
2 Torque the catcher pin 23D and nut 38 to a predetermined torque (by measuring gaps d1 and d2).
3 Apply lock nut and confirm resistive torque in un-failed condition (unloaded pin torque).

To inspect the catcher pin during service life:
1 Apply torque with torque wrench and record resistive torque.
2 If resistive torque is greater than the measured unloaded pin torque, failure of a component of the engine mounting will be suspected and must be checked. Thus by use of the device according to the present invention, a simple and reliable inspection procedure can be carried out using standard tools and no additional parts.

Although conical spring washers are described in the above embodiments, it will be appreciated that any other form of compressible element such as a standard spring washer, or other resilient element may be used in place of the or each conical spring washer. Furthermore, any number of compressible elements may be provided or compressible elements may be omitted altogether in the simplest arrangement.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

What is claimed is:

1. A method of testing a catcher pin assembly to determine if a catcher pin is carrying load applied by a structure supported on a mounting element, the assembly comprising: the mounting element; the catcher pin; a compressible element; and a retaining element which is lockable to the catcher pin, wherein the compressible element being compressed between at least one of a head of the catcher pin and the mounting element and between the retaining element and the mounting element, in an assembled condition of the assembly, such that the compressible element applies a predetermined resistance to movement of the catcher pin relative to the mounting element; and the method comprising:
    applying a predetermined force to the catcher pin sufficient to overcome the predetermined resistance to movement of the catcher pin, and determining whether the catcher pin moves relative to the mounting element, wherein the catcher pin is not carrying the load applied by the structure when the catcher pin moves relative to the mounting element, and the catcher pin is carrying the load applied by the structure when the catcher does not move relative to the mounting element.

2. A method of testing a catcher pin assembly as claimed in claim 1, wherein said predetermined force is a predetermined torque, and said resistance to movement is a resistance to rotational movement of the catcher pin.

3. A method of testing a catcher pin assembly as claimed in claim 1, wherein said structure comprises a rotary machine.

4. A method of testing a catcher pin assembly, the assembly comprising a catcher pin; a lockable retaining element; and a mounting element; and the method comprising passing the catcher pin through the mounting element into the lockable retaining element;

using the retaining element to tighten the catcher pin assembly to a predetermined degree;

locking the lockable retaining element to the catcher pin;

determining an unloaded catcher pin torque at which the catcher pin will rotate relative to the mounting element when the catcher pin is not loaded;

subsequently applying a test torque at least equal to the unloaded catcher pin torque to the catcher pin; and determining whether the catcher pin moves relative to the mounting element, wherein the catcher pin is not carrying a load applied by a structure when the catcher pin moves relative to the mounting element, and the catcher pin is carrying the load applied by the structure when the catcher does not move relative to the mounting element.

5. A method of testing a catcher pin assembly as claimed in claim 4, wherein a compressible element is located on the catcher pin and is compressed between at least one of a head of the catcher pin and the mounting element and between the retaining element and the mounting element when the catcher pin assembly is tightened.

6. A method of testing a catcher pin assembly as claimed in claim 5, wherein the compressible element comprises at least one conical spring washer.

7. A method of testing a catcher pin assembly as claimed in claim 4, wherein the lockable retaining element comprises a nut.

* * * * *